(12) United States Patent
Libman et al.

(10) Patent No.: US 11,829,123 B2
(45) Date of Patent: Nov. 28, 2023

(54) SYSTEMS AND METHODS FOR MANAGING MATERIAL BALANCE BETWEEN INCOMING AND OUTGOING STREAMS OF A MATERIAL IN AN INDUSTRIAL SYSTEM

(71) Applicant: FTD Solutions Inc., Colorado Springs, CO (US)

(72) Inventors: Vyacheslav Libman, Danville, CA (US); Alexander Kondratov, Haifa (IL); Boris Eliosov, State College, PA (US)

(73) Assignee: FTD Solutions Inc., Colorado Springs, CO (US)

( * ) Notice: Subject to any disclaimer, the term of this patent is extended or adjusted under 35 U.S.C. 154(b) by 0 days.

(21) Appl. No.: 17/563,404

(22) Filed: Dec. 28, 2021

(65) Prior Publication Data
US 2023/0205188 A1    Jun. 29, 2023

(51) Int. Cl.
*G05B 19/418* (2006.01)

(52) U.S. Cl.
CPC ............. *G05B 19/41865* (2013.01); *G05B 2219/31376* (2013.01)

(58) Field of Classification Search
CPC ............. G05B 19/41865; G05B 2219/31376
See application file for complete search history.

(56) References Cited

U.S. PATENT DOCUMENTS

| 11,163,927 B1* | 11/2021 | Kauders | G06F 30/18 |
| 2008/0187658 A1* | 8/2008 | Mauchle | B05B 12/081 |
| | | | 427/180 |
| 2020/0239345 A1* | 7/2020 | Wan | C02F 9/00 |

FOREIGN PATENT DOCUMENTS

| CN | 110195619 | * | 9/2019 |
| JP | 2013064793 | * | 4/2013 |

* cited by examiner

*Primary Examiner* — Thomas C Lee
*Assistant Examiner* — Ameir Myers
(74) *Attorney, Agent, or Firm* — ArentFox Schiff LLP; Michael Fainberg

(57) ABSTRACT

Disclosed herein are systems and method for managing material balance between incoming and outgoing streams of material in an industrial system. A method may include providing a graphical user interface (GUI) that enables a system administrator to generate a visual model of the industrial system that includes (1) elements that are interconnected in the industrial system, and (2) streams including at least one incoming stream of material to each element and at least one outgoing stream of material from each element. The method may include receiving, via the GUI, a plurality of parameters of the elements and the streams such as material chemistry, user demand of each user element of the user elements, and flowrate for each stream of the streams. The method may include determining a category of each stream and automatically balancing, by a processor, incoming and outgoing streams for each element.

15 Claims, 6 Drawing Sheets

400

┌─────────────────────────────────────────────────────────────┐
│ Provide a graphical user interface (GUI) that enables a system │ ⟵ 402
│ administrator to generate a visual model of the industrial system │
└─────────────────────────────────────────────────────────────┘
                              ↓
┌─────────────────────────────────────────────────────────────┐
│ Receive, via the GUI from the system administrator, a plurality of │ ⟵ 404
│ parameters of the elements and the streams, the parameters include at │
│ least material chemistry, user demand of each user element of the user │
│ elements, and flowrate for each stream of the streams │
└─────────────────────────────────────────────────────────────┘
                              ↓
┌─────────────────────────────────────────────────────────────┐
│ Determine a category of each stream │ ⟵ 406
└─────────────────────────────────────────────────────────────┘
                              ↓
┌─────────────────────────────────────────────────────────────┐
│ Balance incoming and outgoing streams for each element based on the │ ⟵ 408
│ category │
└─────────────────────────────────────────────────────────────┘

FIG. 4

SYSTEMS AND METHODS FOR MANAGING MATERIAL BALANCE BETWEEN INCOMING AND OUTGOING STREAMS OF A MATERIAL IN AN INDUSTRIAL SYSTEM

FIELD OF TECHNOLOGY

The present disclosure relates to the field of industrial operation management, and, more specifically, to systems and methods for managing material balance between incoming and outgoing streams of a material in an industrial system.

BACKGROUND

Material balance is an important tool for managing industrial operations. While conventional software such as spreadsheets can be used for its development, such software is not well suited for modeling complex operations with multiple interconnected systems. In such cases, developing material balance requires a more detailed definition of the balancing method for incoming and outgoing flows as well as for loads of each system element and the entire system.

SUMMARY

To address these shortcomings, the present disclosure describes a management tool for achieving material balance in an industrial system.

In one exemplary aspect, the techniques described herein relate to a computer-implemented method for managing material balance between incoming and outgoing streams of material in an industrial system, the method including: providing a graphical user interface (GUI) that enables a system administrator to generate a visual model of the industrial system, the industrial system including (1) elements that are interconnected in the industrial system, and (2) streams including at least one incoming stream of material to each element and at least one outgoing stream of material from each element; receiving, via the GUI from the system administrator, a plurality of parameters of the elements and the streams, the parameters include at least material chemistry, user demand of each user element of the user elements, and flowrate for each stream of the streams; determining a category of each stream and, based on the category, automatically balancing, by a processor, incoming and outgoing streams for each element; wherein the balancing includes: for a first stream category that provides material to a user element, calculating, by the processor, an amount of material in an incoming stream based at least on parameters of an outgoing stream specified by the system administrator; for a second stream category that transports used material from a user element, calculating, by the processor, an amount of spent material in an outgoing stream based at least on parameters of an incoming stream specified by the system administrator; and for a third stream category that reclaims spent material for reuse, determining, by the processor, and automatically adding to the visual model, a stitching element between a stream of spent material by a user element and a stream of reclaimed material back to the user element, wherein the stitching element balances a demand for reclaimed material and an available reclaimed material quantity.

In some aspects, the techniques described herein relate to a computer-implemented method, wherein the stitching element defines an amounted material that a given user element needs and an amounted material that can be available.

In some aspects, the techniques described herein relate to a computer-implemented method, further including: determining whether the amount of the reclaimed material that the given user element needs is greater than the amount of the reclaimed material that can be available; in response to determining that the amount of the reclaimed material that the given user element needs is greater than the amount of the reclaimed material that can be available, calculating an amount of new material to provide to the given user element, wherein a sum of the amount of new material and the amount of the reclaimed material that can be available is equal to the amount of the reclaimed material that the given user element needs.

In some aspects, the techniques described herein relate to a computer-implemented method, further including: in response to determining that the amount of the reclaimed material that the given user element needs is not greater than the amount of the reclaimed material that can be available, calculating an outgoing stream of the reclaimed material from the stitching element based on the amount of the reclaimed material that the given user element needs.

In some aspects, the techniques described herein relate to a computer-implemented method, further including: calculating all waste streams upstream from the stitching element based on the calculated outgoing stream material from the stitching element.

In some aspects, the techniques described herein relate to a computer-implemented method, further including calculating the amounted material that can be available based on a quality of the spent material.

In some aspects, the techniques described herein relate to a computer-implemented method, further including evaluating the quality of the spent material by determining whether the quality of the spent material meets a threshold quality for reusing the spent material as the reclaimed material.

In some aspects, the techniques described herein relate to a computer-implemented method, further including calculating the amounted material that can be available based on capacity constraints of elements and/or connections between the elements in the industrial system.

In some aspects, the techniques described herein relate to a computer-implemented method, wherein the industrial system is an industrial water system and wherein the material is water.

It should be noted that the methods described above may be implemented in a system comprising a hardware processor. Alternatively, the methods may be implemented using computer executable instructions of a non-transitory computer readable medium.

In some aspects, the techniques described herein relate to a system for managing material balance between incoming and outgoing streams of material in an industrial system, including: a memory; and a hardware processor communicatively coupled with the memory and configured to: provide a graphical user interface (GUI) that enables a system administrator to generate a visual model of the industrial system, the industrial system including (1) elements that are interconnected in the industrial system, and (2) streams including at least one incoming stream of material to each element and at least one outgoing stream of material from each element; receive, via the GUI from the system administrator, a plurality of parameters of the elements and the streams, the parameters include at least material chemistry, user demand of each user element of the user elements, and flowrate for each stream of the streams; determine a category of each stream and, based on the category, automatically balance incoming and outgoing streams for each element; wherein the hardware processor is configured to balance the incoming and outgoing streams by: for a first stream category that provides material to a user element, calculating an amount of material in an incoming stream based at least on parameters of an outgoing stream specified by the system administrator; for a second stream category that transports used material from a user element, calculating an amount of spent material in an outgoing stream based at least on parameters of an incoming stream specified by the system administrator; and for a third stream category that reclaims spent material for reuse, determining and automatically adding to the visual model, a stitching element between a stream of spent material by a user element and a stream of reclaimed material back to the user element, wherein the stitching element balances a demand for reclaimed material and an available reclaimed material quantity.

In some aspects, the techniques described herein relate to a non-transitory computer readable medium storing thereon computer executable instructions for managing material balance between incoming and outgoing streams of material in an industrial system, including instructions for: providing a graphical user interface (GUI) that enables a system administrator to generate a visual model of the industrial system, the industrial system including (1) elements that are interconnected in the industrial system, and (2) streams including at least one incoming stream of material to each element and at least one outgoing stream of material from each element; receiving, via the GUI from the system administrator, a plurality of parameters of the elements and the streams, the parameters include at least material chemistry, user demand of each user element of the user elements, and flowrate for each stream of the streams; determining a category of each stream and, based on the category, automatically balancing, by a processor, incoming and outgoing streams for each user element; wherein the balancing includes: for a first stream category that provides material to a user element, calculating, by the processor, an amount of material in an incoming stream based at least on parameters of an outgoing stream specified by the system administrator; for a second stream category that transports used material from a user element, calculating, by the processor, an amount of spent material in an outgoing stream based at least on parameters of an incoming stream specified by the system administrator; and for a third stream category that reclaims spent material for reuse, determining, by the processor, and automatically adding to the visual model, a stitching element between a stream of spent material by a user element and a stream of reclaimed material back to the user element, wherein the stitching element balances a demand for reclaimed material and an available reclaimed material quantity.

The above simplified summary of example aspects serves to provide a basic understanding of the present disclosure. This summary is not an extensive overview of all contemplated aspects and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 illustrates a flow diagram of a method for managing material balance between incoming and outgoing streams of a material in an industrial system.

DETAILED DESCRIPTION

Exemplary aspects are described herein in the context of a system, method, and computer program product for managing material balance between incoming and outgoing streams of a material in an industrial system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Achieving material balance requires a detailed definition of the balancing method for incoming/outgoing flows and the loads for each element in an industrial system. Normally, one of two components (i.e., outgoing stream or incoming stream) is defined and the second is calculated. However, if reclaim material needs to be considered in the balance, none of the streams can be easily defined based on readily available data. Reclaim material represents material that has been spent by a customer of the industrial system but may be recycled into an incoming stream because the quality of the spent material is above a predefined standard. The present disclosure presents a software-based solution for achieving material balance when reclaim material is involved. Accordingly, material conservation, element usage efficiency, and overall performance of an industrial system may be enhanced.

Figure 1:
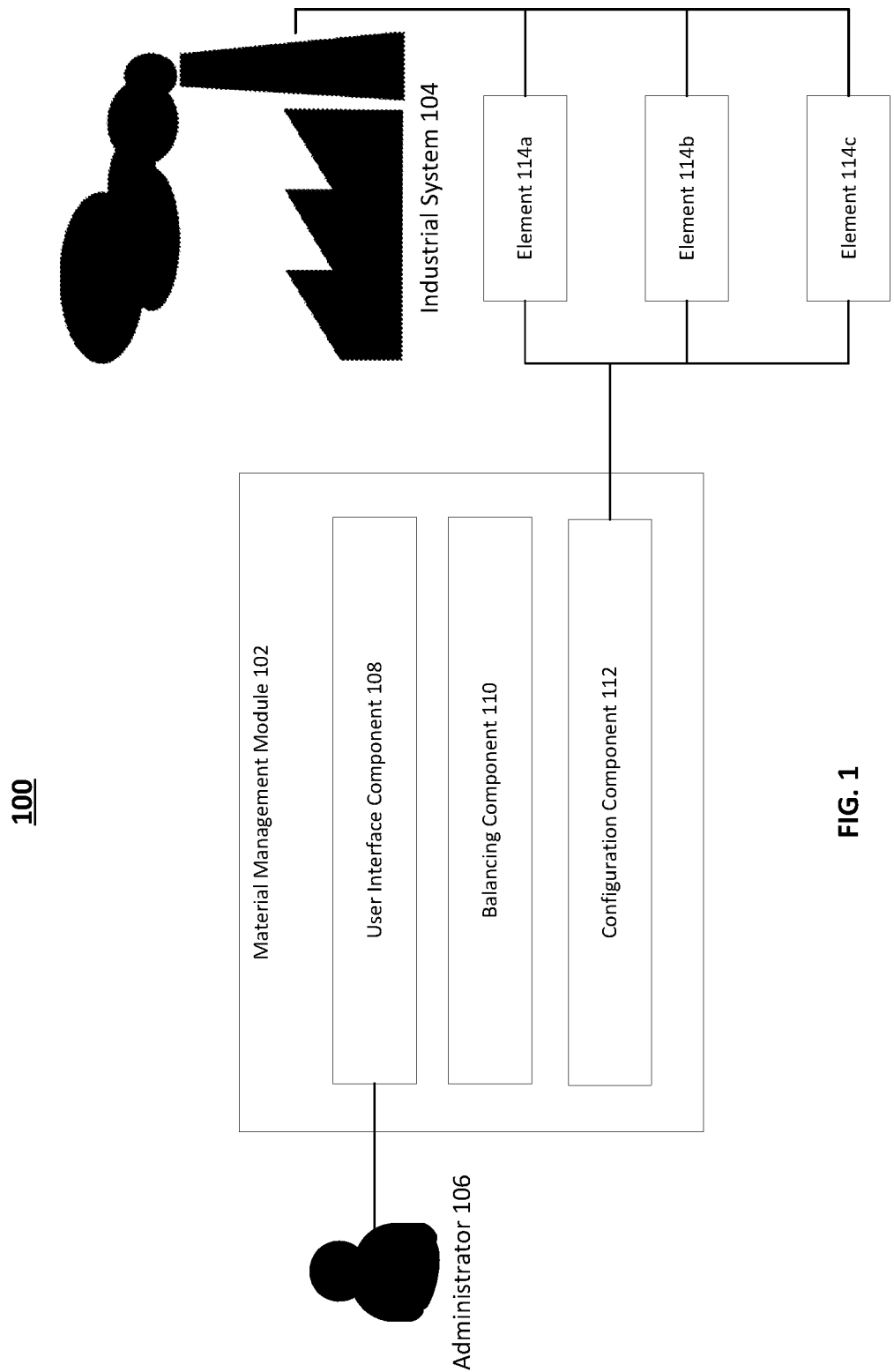
FIG. 1 is a block diagram illustrating a material management module.

FIG. 1 is block diagram 100 illustrating material management module 102. The present disclosure describes the application and functionality of material management module 102, which may be installed and executed on a computing device (e.g., computer system 20 described in FIG. 6). Material management module 102 enables administrator 106 to develop a digital representation of industrial system 104. Industrial system 104 may include multiple elements 114 (e.g., element 114a, 114b, and 114c) such as tanks, reactors, filters, etc., that enable the flow of material such as water. The digital representation of the industrial system 104 may depict, for example, each element and the flow quantity and the chemistry balance of the existing streams between said elements. A "user element" is an element that is directly servicing a user and is associated with the provision and/or consumption of material by a user.

Using this framework, administrator 106 may input information into material management module 102 to create a map of industrial system 104 and to generate calculated outputs in the form of reports detailing the flow quantity and chemistry balance. The reports may help improve the operations of the existing elements or to build new elements. Ultimately, material management module 102 enables: creation and storage of different models of industrial system 104, progressive traceability of changes, corporate sustainability annual reporting, change management, and other important operational functions. In some aspects, material management module 102 is a software-as-a-service (SaaS).

As shown in FIG. 1, industrial system 104 includes element 114a, element 114b, and element 114c. These elements may be mapped to, for example, tank 302, tank 312, and stitching element 314 in FIG. 3. In general, an element is a component of the industrial system and can physically receive, store, and send material. Elements may be physically connected to one another using pipes and rods. In the context of the present disclosure, a material may be any non-solid substance (e.g., gas, liquid, plasma, etc.).

In some aspects, industrial system 104 may be a water industrial system and the material being transferred between the elements may be water. Accordingly, a first element may be a reservoir that stores water, a second element may be a water filtration device, a third element may be a water tank that holds filtered water, a fourth element may be a sewage container that holds spent water. Suppose that administrator 106 is a system administrator of industrial system 104. Administrator 106 may wish to monitor the demand and utilization of water in industrial system 104. The demand may be powered by customers of industrial system 104, which utilize water for basic household purposes (e.g., cleaning, drinking, etc.). Accordingly, administrator 106 may utilize material management module 102 to see usage trends and determine the right amount of water to transfer to the respective elements in order to conserve water, meet demand, remain within environmental compliance limits, improve infrastructure performance, better manage operations, and reduce costs.

Material management module 102 includes three components: user interface component 108, balancing component 110, and configuration component 112. User interface component 108 may receive input information from administrator 106 to generate a digital representation of industrial system 104 for display on the computing device where material management module 102 is installed. Balancing component 110 is configured to analyze the input information and perform material balance algorithms. Configuration component 112 may communicate with and configure real-world counterpart elements 114. For example, configuration component 112 may transmit incoming stream and outgoing stream flow rates in order for elements 114 to make the appropriate flow adjustments that achieve material balance.

Figure 2:
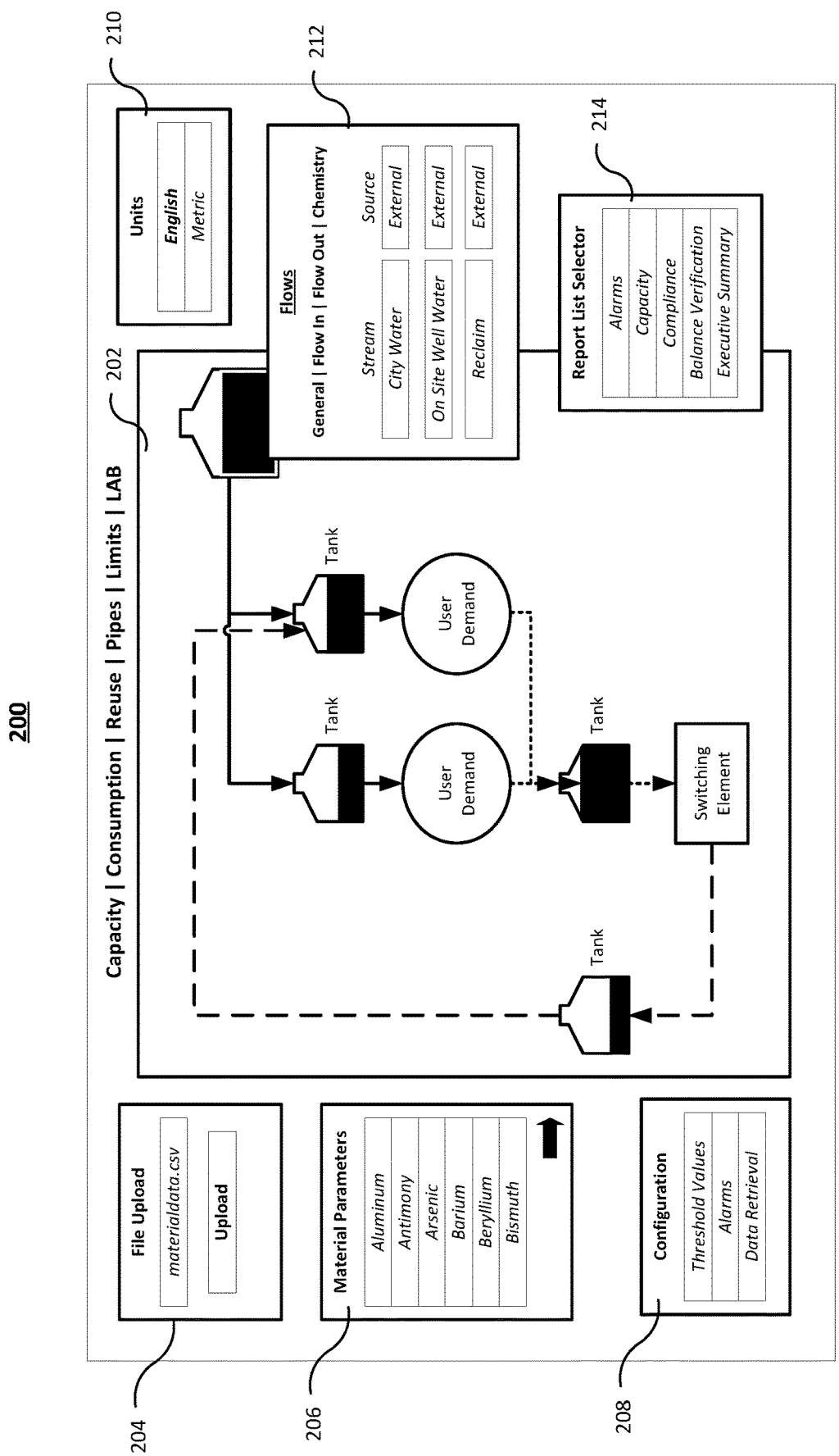
FIG. 2 is a block diagram illustrating a user interface of a material management module.

FIG. 2 is a block diagram illustrating user interface 200 of material management module 102. User interface 200 may be generated by user interface component 108. There are different menus, selection windows, and options in user interface 200. Map 202 depicts a visual representation of each element in a given industrial system. The represent includes connections, flow directions, and user demand identifiers. Upload window 204 enables administrator 106 to upload a spreadsheet (e.g., a csv file) that includes identifiers of each element in the industrial system, material capacities at different timestamps, and material composition values. Material parameter window 206 allows administrator 106 to select and view information about different sub-materials such as aluminum, arsenic, etc., that may make up a given material. By selecting a sub-material, administrator 106 can identify how much of the sub-material is present in different areas of the map (e.g., how much aluminum exists in the stitching element).

Configuration window 208 enables administrator 106 to adjust threshold values used to assess, for example, spent material quality. Configuration window 208 may additionally provide options such as the ability to adjust when material management module 102 alerts the user of an event (e.g., generate an alert when the material capacity in a given element reaches 75%). Lastly, configuration window 208 may include data retrieval options. For example, a user may identify which directories on the computing device to automatically retrieve spreadsheets from. Units window 210 enables administrator 106 to adjust what the units of flow rate, capacity, etc., should be (e.g., gallons or liters). Flows window 212 enables administrator 106 to select streams and identify information such as source, flow rate, destination, chemistry (e.g., material composition). Report list selector 214 enables administrator 106 to generate reports that include information about flow rate, capacity, compliance, etc., as administrator 106 makes adjustments to the digital representation of the industrial system on map 202. For example, administrator 106 may add or remove elements, and subsequently generate a report that provides material balance outputs (e.g., with calculated flow rates and capacities).

In some aspects, multiple users may access user interface 200 simultaneously. For example, two users may access material management module 102 on different devices connected via a network (e.g., the Internet). Material management module 102 may receive input changes from a first user and present the changes in real-time to a second user. The second user may make additional changes to the already-modified map 202, and material management module 102 may transmit the additional changes to the first user's device. As such, several scenarios for managing the industrial system may be made. Material management module 102 may store each scenario and its corresponding values (e.g., flow rate, capacity, chemistry, etc.) in the local memory of the computing device on which material management module 102 is installed and/or a cloud storage device.

Figure 3:
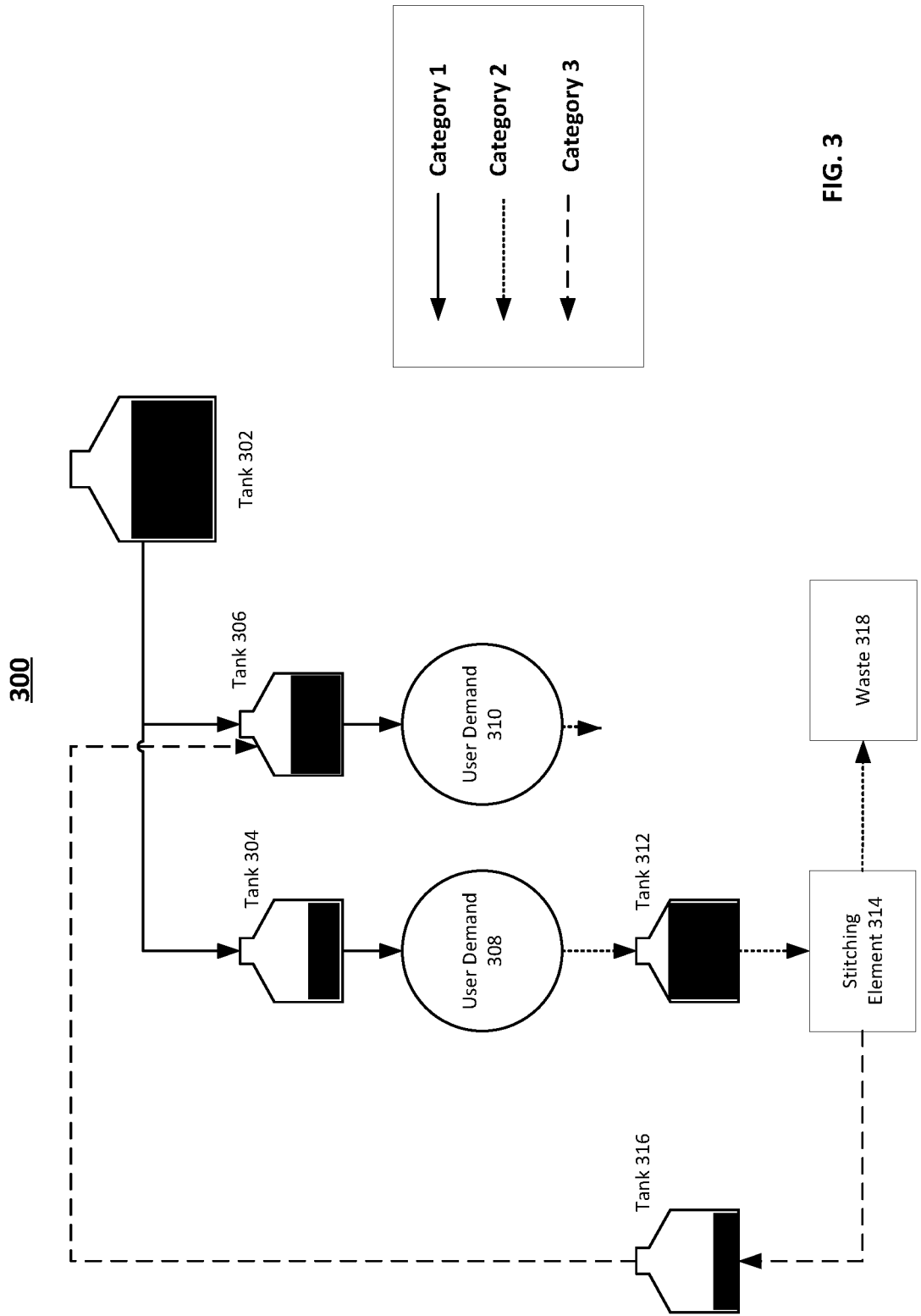
FIG. 3 is a block diagram illustrating an industrial system managed by a material management module.

FIG. 3 is a block diagram illustrating industrial system 300 managed by material management module 102. As discussed previously, an element may have an incoming stream and an outgoing stream. For example, tank 304 has an incoming stream entering from tank 302 and an outgoing stream being consumed by user demand 308. Depending on how much user demand 308 is present, material management module 102 may calculate the amount of the incoming stream from tank 302 needed by tank 304 for servicing. It should be noted that a user of material management module 102 is not the same as a user of a material in the industrial system. A user of material management module 102 is likely a system administrator overseeing operations at industrial system 104. A user of material is a customer/consumer of industrial system 104.

After a user spends material, the spent material is sent to tank 312. In a basic setup, spent material may be gathered and sent to waste 318. For example, the spent material may be transferred to a city wastewater treatment facility. It can also go to irrigation or an external body discharge (e.g., river, sea, etc.).

In a more complicated scenario where part of the spent material is evaluated to be reclaimed, the outgoing stream and the incoming streams are more difficult to determine. For example, if reclaim material is sent to tank 306, the amount of material that tank 302 provides to tank 306 lessens. In this scenario, to provide material balance, material management module 102 may automatically introduce stitching element 314 in the digital representation of industrial system 104. Stitching element 314 determines whether demand for reclaimed material or available reclaimed material quantity should be used for material balance.

In FIG. 3, stitching element 314 sits between the stream of spent material from a user and the stream of reclaimed material going back to the user. In order for material management module 102 to identify stitching element 314, all streams are divided into three categories and parameters are established for which combinations of incoming and outgoing stream types will define stitching element 314. The three categories include:

(1) category 1—streams that provide materials to the user;
(2) category 2—streams that transport used materials from user; and
(3) category 3—streams that reclaim spent material for reuse.

For category 1, balance starts with user demand and each element's incoming stream is calculated based on an outgoing stream to service user demand. For category 2, the incoming stream to the system is defined and the outgoing stream is calculated for each element. For category 3, predetermining the incoming or outgoing stream is not always possible as it requires information that is not readily available. For example, if flow of the spent material calculated for a second stream category is intended for reclaim, it cannot be assumed that that flow is equal to the incoming flow to the reclaim system. First, it must be established what part of the spent material in that flow can be beneficially reclaimed. In turn, any changes in the reclaim stream will impact category 1 streams as less materials need to be provided for an element (e.g., tank 306) with more reclaim.

The size of an outgoing stream in a reclaim system (e.g., stitching element 314) may also depend on material usage and requirements for material quality that must be met to enable reclaim. As a result, the reclaim material amount actually utilized may be limited and may be below the amount of reclaim available. For example, if reclaim water is used for evaporative cooling, the need for reclaim water is limited to evaporation and water blowdown. Practically all industrial facilities use evaporative cooling. From the mass balance point of view, a cooling tower is one of the users (e.g., user demand 310). A majority of the water in the cooling tower will be evaporated with some fraction of the stream discharged. A cooling tower would thus receive reclaim water. Even if larger quantity of reclaim water can be generated for that purpose by stitching element 314, however, it cannot be beneficially used as it is not needed. Therefore, the outgoing stream in that case may be defined by the needs of the user as opposed to the available incoming flow.

To develop material balance for third stream categories and incorporate reclaim material into the overall site material balance, material management module 102 manages stitching element 314 based on two quantities:

(1) quantity 1—an amount of reclaim material a user needs; and
(2) quantity 2—an amount of reclaim material that can be available.

Material management module 102 may assign each stream in system 300 to a category. This is shown in FIG. 3, where first stream categories are depicted with a solid arrow, second stream categories are depicted with a dotted arrow, and third stream categories are represented by a dashed arrow.

After stitching element 314 is introduced or identified, balancing component 110 compares quantities 1 and 2. If quantity 1 (e.g., user demand 310) is equal to or greater than quantity 2 (e.g., output reclaim material from stitching element 314 to tank 316), stitching element 314 is balanced by calculating an incoming stream to tank 306 from tank 316 based on the defined outgoing stream (i.e., quantity 1). If quantity 2 is greater than quantity 1, the incoming stream to tank 306 is calculated based on the defined outgoing stream (i.e., quantity 2) and all streams upstream of stitching element 314 are recalculated based on the newly calculated incoming stream to stitching element 314.

In some aspects, administrator 106 may interact with map 202 in FIG. 2 by adjusting user demand 308 and user demand 310. Based on the changes, balancing component 110 may automatically update the incoming and outgoing streams of each element in industrial system 300 to provide material balance. In some aspects, configuration component 112 may transmit the updated stream information to the real-world counterparts of industrial system 300 so they can replicate the changes made in map 202 by administrator 106.

Consider an example with limited availability of reclaim material. Balancing component 110 may calculate an amount of new material to provide to a given user element (e.g., tank 306 that services user demand 308). Here, a sum of the amount of new material and the amount of the reclaimed material that can be available is equal to the amount of the reclaimed material that the given user element needs. For example, user demand 308 may be 100 gallons per minute (gpm). Tank 304 may thus provide 100 gpm of clean material (e.g., clean water) to satisfy user demand 308. Suppose that all of the material being input is also outputted within the system (i.e., 100 gpm of material either goes to waste 318 or tank 316). Stitching element 314 may thus receive 100 gpm of spent material. In this example, 20 gpm is a waste by-product of treatment by tank 312 and must be sent to waste 318 from stitching element 314 because that portion of the spent material cannot be reclaimed (e.g., the quality of the spent material is less than a threshold quality). This leaves 80 gpm of reclaim material (i.e., quantity 2) available for reuse that is forwarded to tank 316 by stitching element 314. This is reusable material. Balancing component 110 determines that user demand 310 is 150 gpm (i.e., quantity 1). Balancing component 110 further determines that because quantity 1 is greater than quantity 2, the input stream of tank 306 coming from tank 316 should be 80 gpm. This is because user demand 310 is high enough to utilize all of the reclaim material. Thus, tank 306 only needs 70 gpm of clean material from tank 302. Accordingly, balancing component 110 recalculates all streams upstream of the stitching element based on the calculated incoming stream to tank 316. If tank 302 was originally providing 150 gpm to tank 306, the value is recalculated to 70 gpm. Likewise, the output stream of tank 306 and user demand 310 is updated. Depending on the scale of the industrial system, more flow rates may be updated as well.

In some aspects, configuration component 112 may transmit a command to tank 302 to provide 100 gpm of clean material to tank 304 and 70 gpm of clean material to tank 306. Configuration component 112 may further transmit a command to stitching element 314 to adjust an output stream of reclaim material to tank 316 to 80 gpm. This way, tank 316 may provide 80 gpm of reclaim material to tank 306.

Consider another example in which reclaim material availability is greater than user demand. For example, user demand 310 may be 50 gpm. Balancing component 110 may determine that the demand is less than the available amount of reclaim material (e.g., 80 gpm). In this case, user demand 310 can be completely serviced by reclaim material. In fact, there is an excess of reclaim material by 30 gpm. Balancing component 110 may adjust stitching element 314 to transfer this excess to waste 318 and to transfer 50 gpm of reclaim material to tank 316. Tank 316 may thus provide 50 gpm of reclaim material to tank 306 in order to meet user demand 310. Balancing component 110 may adjust an output stream from tank 302 to tank 306 to 0 gpm because additional clean water is not needed. Accordingly, water is conserved.

FIG. 4 illustrates a flow diagram of method 400 for managing material balance between incoming and outgoing streams of a material in an industrial system. At 402, material management module 102 provides a GUI (e.g., user interface 200 generated by user interface component 108) that enables a system administrator (e.g., administrator 106) to generate a visual model (e.g., map 202) of an industrial system (e.g., industrial system 104). The digital representation of the industrial system may include elements (e.g., tank 302, waste 318, etc.) that are interconnected in the real-world counterpart industrial system. The digital representation may further include streams comprising at least one incoming stream of material to each element and at least one outgoing stream of material from each element. For example, tank 306 has an incoming stream from tank 302 and an outgoing stream to user demand 310.

At 404, material management module 102 receives, via the GUI (e.g., user interface 200) from the system administrator (e.g., administrator 106), a plurality of parameters of the elements and the streams. The parameters may include at least: material chemistry, user demand of each user element of the user elements, and flowrate for each stream of the streams. In some aspects, these parameters are provided by the user via a spreadsheet entered via a file upload window (e.g., window 204). Material chemistry parameters may be displayed in a material parameters window 206, user demand may be indicated on map 202 (e.g., user demand 308), and flowrate may be indicated in a flows window (e.g., window 212).

At 406, material management module 102 determines a category of each stream. As described previously, there may be three categories that a stream may be classified into: category 1 (streams that provide materials to the user), category 2 (streams that transport used materials from user), and category 3 (streams that reclaim spent material for reuse). Balancing component 110 may perform a classification by identifying user demand elements (e.g., user demand 308) and selecting all streams that are upstream as category 1, all streams that are downstream as category 2, and all streams that are downstream from a stitching element as category 3.

At 408, material management module 102 automatically balances, based on the category, incoming and outgoing streams for each element. The objective of balancing may be different depending on the scenario. For example, balancing to conserve material may be different than balancing to become compliant with a federal regulation. The balancing process is described in FIG. 5.

Figure 5:
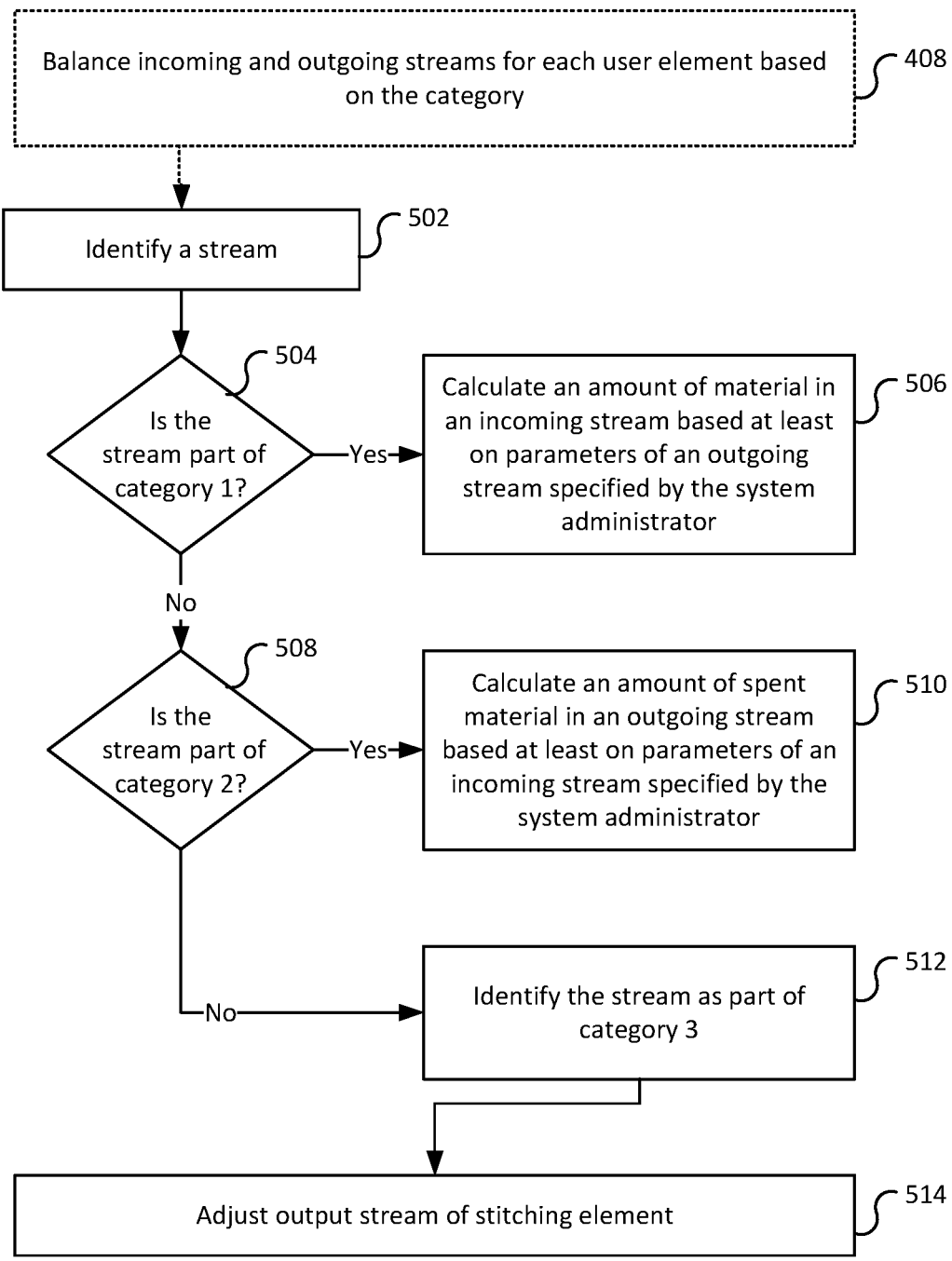
FIG. 5 illustrates a flow diagram of a method for calculating material amounts based on an identified category of a stream.

FIG. 5 illustrates a flow diagram of method 500 for calculating material amounts based on an identified category of a stream. At 502, balancing component 110 identifies a stream (e.g., stream between tank 302 and tank 304). At 504, balancing component 110 determines whether the identified stream is part of category 1. Because the identified stream in this example provides material to a user element (e.g., tank 304 that directly services user demand), balancing component 110 determines that the identified stream is category 1. In some aspects, a user may manually identify the category of the identified stream, in which case balancing component 110 determines whether the identified stream is part of category 1 based on a user input (e.g., in the user interface). Method 500 thus proceeds to 506. At 506, balancing component 110 calculates an amount of material in an incoming stream based at least on parameters of an outgoing stream specified by the system administrator. For example, if the outgoing stream of tank 304 is 100 gpm to meet user demand 308, balancing component 110 sets the incoming stream of tank 304 from tank 302 to 100 gpm.

Suppose that the identified steam at 502 is the outgoing stream from tank 312. If no reclaiming system exists, this stream goes to waste 318. At 504, balancing component 110 may determine that the identified stream is not part of category 1 and proceeds to determine, at 508, whether the stream is part of category 2. Because the identified stream transports used material from a user element (e.g., spent material serviced to meet user demand), balancing component 110 may determine that the identified stream is part of category 2 and method 500 proceeds to 510. At 510, balancing component 110 calculates an amount of spent material in an outgoing stream based at least on parameters of an incoming stream specified by the system administrator. For example, if the incoming stream in tank 312 from user demand 308 is 100 gpm, balancing component 110 sets the outgoing stream of tank 312 as 100 gpm.

Suppose that balancing component 110 determines that the industrial system uses reuses spent material of a threshold quality. Accordingly, balancing component 110 may add a stitching element to the system. In this case, if the identified stream at 502 is between tank 316 and 306, balancing component 110 may determine that the stream is neither category 1 or category 2 and identify, at 512, that the stream is part of category 3. Method 500 proceeds to 514, where balancing component 110 adjusts the output stream of the stitching element. Here, the stitching element balances a demand for reclaimed material and an available reclaimed material quantity. The stitching element (e.g., stitching element 314) sits between a stream of spent material by a user element (e.g., output stream of tank 312) and a stream of reclaimed material back to the user element (e.g., output stream of tank 316).

The stitching element defines an amount of the reclaimed material that a given user element needs (i.e., quantity 1 described above) and an amount of the reclaimed material that can be available (i.e., quantity 2 described above). In terms of the amount of the reclaimed material that can be made available, balancing component 110 may evaluate the quality of the spent material and calculate the amount of the reclaimed material accordingly. In some aspects, balancing component 110 may evaluate the quality of the spent material by determining whether the quality of the spent material meets a threshold quality for reusing the spent material as the reclaimed material.

As discussed previously, administrator 106 may set threshold values using the configuration window 208. A threshold value may be, for example, a maximum amount of sub-material inside the spent material. If the spent material is water, the sub-material may be a heavy metal such as arsenic. If more than a threshold amount of arsenic is detected in the water, the water may be deemed as non-reusable. Depending on the purpose of material usage, the threshold values may change. Thus, if the water is meant for drinking purposes, the threshold values may be low to prevent health safety issues and if the water is meant for cleaning, the threshold values may be higher in comparison. Because material consumption happens in real-time, at certain times, the spent material may meet quality thresholds and at other times, the spent material may not meet quality thresholds.

In some aspects, material management module 102 tracks the capacity constraints of each element and each connection (e.g., pipe, tube, etc.) between elements in the industrial system. Accordingly, material management module 102 may also calculate the amount of the reclaimed material that can be available based on capacity constraints of said elements and/or said connections. For example, if the amount of reclaimed material that can be extracted from the spent material is 300 gpm, but any combination of elements in the industrial system (e.g., tank 316, tank 306, etc.) and the pipes connecting said elements can only store 250 gpm at any given time, despite the quality of the spent material being high enough to warrant reclaiming 300 gpm, material management module 102 will only reclaim 250 gpm and transfer the remaining 50 gpm to waste 318.

In an alternative exemplary aspect, a computer-implemented method of a material balance management software that monitors the flow of liquid or gaseous materials in an industrial facility may comprise: identifying, in an industrial materials system, (1) a first element that enables flow of a material to at least one user, (2) a second element that enables flow of a spent material from the at least one user, and (3) a stitching element that enables flow of a reclaim material to the first element; determining a quantity of the spent material in an outgoing stream of the second element based on an outgoing stream of the material from the first element; calculating a first amount of the reclaim material available to be reused based on the quantity of spent material and a quality of the spent material; determining a second amount of the reclaim material needed based on an incoming stream of the first element and the outgoing stream of the first element; in response to determining that the first amount is equal to or larger than the second amount, configuring an incoming stream of the stitching element to be equal to the second amount of the reclaim material; and generating, for display, identifiers of the first element, the second element, and the stitching element and associated incoming and outgoing streams on a visual user interface of the material balance management software.

In some alternative aspects, the material balance management software is a software as a service (SaaS). In some alternative aspects, the material balance management software is further configured to transmit a command to the stitching element to configure the incoming stream of the stitching element. In some alternative aspects, the material balance management software receives status updates from the first element and the second element about usage of the material and generates, for display on the visual user interface, statistics about the usage. In some alternative aspects, in response to determining that the first amount is not equal to or larger than the second amount, the method comprises configuring the incoming stream of the stitching element to be equal to the first amount of the reclaim material. In some alternative aspects, the incoming stream into the first element is decreased when an outgoing stream of the stitching element is increased to maintain the material balance. In some alternative aspects, evaluating the quality of the spent material comprises determining whether the quality of the spent material meets a threshold quality for reusing the spent material as the reclaim material. In some alternative aspects, determining the second amount of the reclaim material needed further comprises determining a purpose for using the reclaim material, in response to determining that the purpose has a low user demand, decreasing the second amount of the reclaim material.

Figure 6:
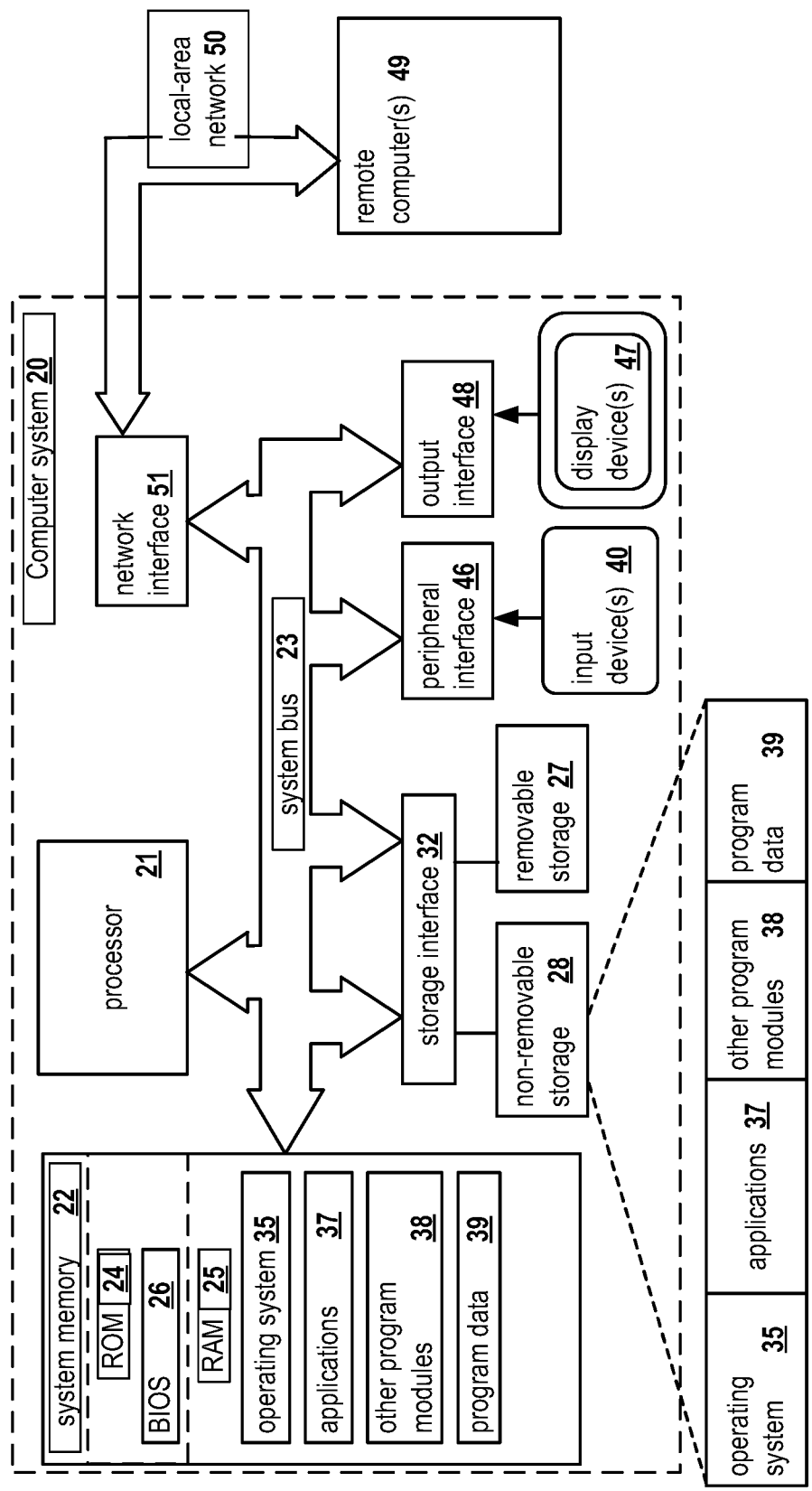
FIG. 6 presents an example of a general-purpose computer system on which aspects of the present disclosure can be implemented.

FIG. 6 is a block diagram illustrating a computer system 20 on which aspects of systems and methods for managing material balance between incoming and outgoing streams of a material in an industrial system may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I$^2$C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for managing material balance between incoming and outgoing streams of material in an industrial system, the method comprising:
    providing a graphical user interface (GUI) that enables a system administrator to generate a visual model of the industrial system, the industrial system comprising (1) elements that are interconnected in the industrial system, and (2) streams comprising at least one incoming stream of material to each element and at least one outgoing stream of material from each element;
    receiving, via the GUI from the system administrator, a plurality of parameters of the elements and the streams, the parameters include at least material chemistry, user demand of each user element of the user elements, and flowrate for each stream of the streams;
    determining a category of each stream and, based on the category, automatically balancing, by a processor, incoming and outgoing streams for each element;
    wherein the balancing includes:
        for a first stream category that provides material to a user element, calculating, by the processor, an amount of material in an incoming stream based at least on parameters of an outgoing stream specified by the system administrator;
        for a second stream category that transports used material from a user element, calculating, by the processor, an amount of spent material in an outgoing stream based at least on parameters of an incoming stream specified by the system administrator; and
        for a third stream category that reclaims spent material for reuse, determining, by the processor, and automatically adding to the visual model, a stitching element between a stream of spent material by a user element and a stream of reclaimed material back to the user element, wherein the stitching element balances a demand for reclaimed material and an available reclaimed material quantity, further comprising:
            calculating the available reclaimed material quantity based on a quality of the spent material meeting a threshold quality for reusing the spent material as the reclaimed material; and
        wherein, based on the balancing, a given user element is simultaneously provided, in real-time using the stitching element, both new material and the reclaimed material such that a sum of an amount of the new material and the available reclaimed material quantity is equal to an amount of the reclaimed material that the given user element needs.

2. The computer-implemented method of claim 1, wherein the stitching element defines the amount of the reclaimed material that the given user element needs and the available reclaimed material quantity.

3. The computer-implemented method of claim 2, further comprising:
    determining whether the amount of the reclaimed material that the given user element needs is greater than the available reclaimed material quantity; and
    in response to determining that the amount of the reclaimed material that the given user element needs is greater than the available reclaimed material quantity, calculating the amount of new material to provide to the given user element.

4. The computer-implemented method of claim 3, further comprising:
    in response to determining that the amount of the reclaimed material that the given user element needs is not greater than the available reclaimed material quantity, calculating an outgoing stream of the reclaimed material from the stitching element based on the amount of the reclaimed material that the given user element needs.

5. The computer-implemented method of claim 4, further comprising:
    calculating all waste streams upstream from the stitching element based on the calculated outgoing stream of the reclaimed material from the stitching element.

6. The computer-implemented method of claim 2, further comprising: calculating the available reclaimed material quantity based on capacity constraints of elements and/or connections between the elements in the industrial system.

7. The computer-implemented method of claim 1, wherein the industrial system is an industrial water system and wherein the material is water.

8. A system for managing material balance between incoming and outgoing streams of material in an industrial system, comprising:
    a memory; and
    a hardware processor communicatively coupled with the memory and configured to:
        provide a graphical user interface (GUI) that enables a system administrator to generate a visual model of the industrial system, the industrial system comprising (1) elements that are interconnected in the industrial system, and (2) streams comprising at least one incoming stream of material to each element and at least one outgoing stream of material from each element;
        receive, via the GUI from the system administrator, a plurality of parameters of the elements and the streams, the parameters include at least material chemistry, user demand of each user element of the user elements, and flowrate for each stream of the streams;
        determine a category of each stream and, based on the category, automatically balance incoming and outgoing streams for each element;
        wherein the hardware processor is configured to balance the incoming and outgoing streams by:
            for a first stream category that provides material to a user element, calculating an amount of material in an incoming stream based at least on parameters of an outgoing stream specified by the system administrator;
            for a second stream category that transports used material from a user element, calculating an amount of spent material in an outgoing stream based at least on parameters of an incoming stream specified by the system administrator; and for a third stream category that reclaims spent material for reuse, determining and automatically adding to the visual model, a stitching element between a stream of spent material by a user element and a stream of reclaimed material back to the user element, wherein the stitching element balances a demand for reclaimed material and an available reclaimed material quantity, further comprising:

calculating the available reclaimed material quantity based on a quality of the spent material meeting a threshold quality for reusing the spent material as the reclaimed material; and wherein, based on the balancing, a given user element is simultaneously provided, in real-time using the stitching element, both new material and the reclaimed material such that a sum of an amount of the new material and the available reclaimed material quantity is equal to an amount of the reclaimed material that the given user element needs.

9. The system of claim 8, wherein the stitching element defines the amount of the reclaimed material that the given user element needs and the available reclaimed material quantity.

10. The system of claim 9, wherein the hardware processor is further configured to:

determine whether the amount of the reclaimed material that the given user element needs is greater than the available reclaimed material quantity; and in response to determining that the amount of the reclaimed material that the given user element needs is greater than the available reclaimed material quantity, calculate the amount of new material to provide to the given user element.

11. The system of claim 10, wherein the hardware processor is further configured to:

in response to determining that the amount of the reclaimed material that the given user element needs is not greater than the available reclaimed material quantity, calculate an outgoing stream of the reclaimed material from the stitching element based on the amount of the reclaimed material that the given user element needs.

12. The system of claim 11, wherein the hardware processor is further configured to:

calculate all waste streams upstream from the stitching element based on the calculated outgoing stream of the reclaimed material from the stitching element.

13. The system of claim 9, wherein the hardware processor is further configured to calculate the available reclaimed material quantity based on capacity constraints of elements and/or connections between the elements in the industrial system.

14. The system of claim 8, wherein the industrial system is an industrial water system and wherein the material is water.

15. A non-transitory computer readable medium storing thereon computer executable instructions for managing material balance between incoming and outgoing streams of material in an industrial system, including instructions for:

providing a graphical user interface (GUI) that enables a system administrator to generate a visual model of the industrial system, the industrial system comprising (1) elements that are interconnected in the industrial system, and (2) streams comprising at least one incoming stream of material to each element and at least one outgoing stream of material from each element;

receiving, via the GUI from the system administrator, a plurality of parameters of the elements and the streams, the parameters include at least material chemistry, user demand of each user element of the user elements, and flowrate for each stream of the streams;

determining a category of each stream and, based on the category, automatically balancing, by a processor, incoming and outgoing streams for each element;

wherein the balancing includes:

for a first stream category that provides material to a user element, calculating, by the processor, an amount of material in an incoming stream based at least on parameters of an outgoing stream specified by the system administrator;

for a second stream category that transports used material from a user element, calculating, by the processor, an amount of spent material in an outgoing stream based at least on parameters of an incoming stream specified by the system administrator; and for a third stream category that reclaims spent material for reuse, determining, by the processor, and automatically adding to the visual model, a stitching element between a stream of spent material by a user element and a stream of reclaimed material back to the user element, wherein the stitching element balances a demand for reclaimed material and an available reclaimed material quantity, further comprising:

calculating the available reclaimed material quantity based on a quality of the spent material meeting a threshold quality for reusing the spent material as the reclaimed material; and wherein, based on the balancing, a given user element is simultaneously provided, in real-time using the stitching element, both new material and the reclaimed material such that a sum of an amount of the new material and the available reclaimed material quantity is equal to an amount of the reclaimed material that the given user element needs.

\* \* \* \* \*